United States Patent [19]

Takano et al.

[11] Patent Number: 5,045,844

[45] Date of Patent: Sep. 3, 1991

[54] IMAGE PARALLELING AND ROTATING SYSTEM

[75] Inventors: Sakuharu Takano; Sumio Kita, both of Nara, Japan

[73] Assignee: Sharp Kabushiki Kaisha, Osaka, Japan

[21] Appl. No.: 263,194

[22] Filed: Oct. 27, 1988

[30] Foreign Application Priority Data

Oct. 29, 1987 [JP] Japan .................................. 62-274173

[51] Int. Cl.$^5$ .................................................. G09G 1/06
[52] U.S. Cl. ..................................... 340/724; 340/727; 178/18
[58] Field of Search ............... 340/724, 727, 749, 712, 340/709, 710; 364/518, 519, 521; 382/46; 178/18

[56] References Cited

U.S. PATENT DOCUMENTS

| | | | |
|---|---|---|---|
| 4,618,859 | 10/1986 | Ikeda ..................................... | 340/724 |
| 4,618,991 | 10/1986 | Tabata et al. ........................ | 340/727 |
| 4,677,258 | 6/1987 | Kawashima et al. ................ | 340/727 |
| 4,701,752 | 10/1987 | Wang .................................... | 340/724 |
| 4,737,773 | 4/1988 | Kokayashi ........................... | 340/727 |
| 4,868,522 | 8/1987 | Hernandez et al. ................. | 340/927 |

Primary Examiner—Jeffrey A. Brier
Assistant Examiner—M. Fatahiyar

[57] ABSTRACT

In an image information processing apparatus including a combined display and input unit, which includes a coordinate specifying unit for specifying on a screen a rectangular area containing an image and also specifiying the destination to which it is to be moved, a mode specifying unit for specifying a move mode for the rectangular area to be a paralleling mode or a rotating mode, and a position specifying unit for enabling the specification of the destination, an image paralleling and rotating system is disclosed, when the rectangular area specified by the coordinate specifying unit is displaying in the screen as moved to the destination, enabled by the position specifying unit, in accordance with instructions made by the mode specifying unit, a decision is made to determine if the coordinate specifying unit has specified a predetermined neighboring portion of a corner of the rectangular area so displayed. Further, if a result of the decision indicates that the coordinate specifying unit has specified the neighboring portion of the corner of the rectangular area, instructions from the mode specifying unit and the coordinate specifying unit are rendered to be valid. This thereby avoids an erroneous movement of the rectangular area instructed by an erroneous instruction from the coordinate specifying unit.

1 Claim, 2 Drawing Sheets

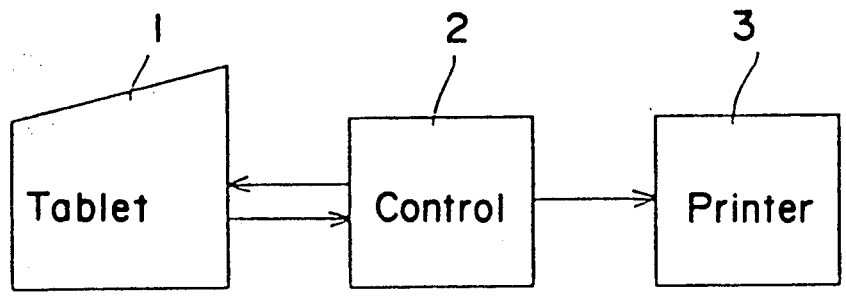
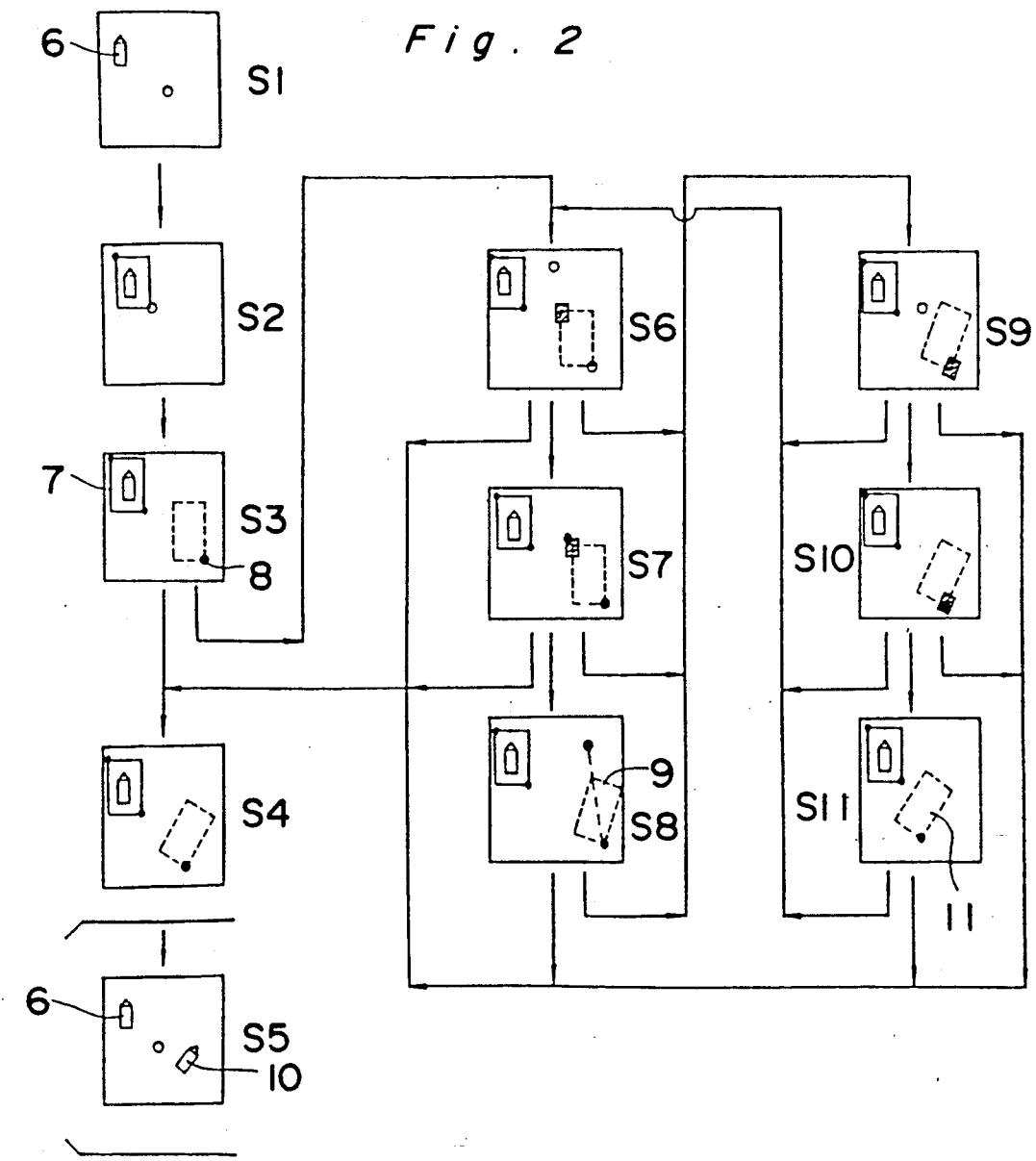
Fig. 2

IMAGE PARALLELING AND ROTATING SYSTEM

BACKGROUND OF THE INVENTION

1. Field of the Invention

The present invention generally relates to an image information processing apparatus including an input unit, such as a combined display and tablet, and a control unit. The control unit is adapted to be inputted with information from the input unit and is operable to perform a compiling process. The control unit then outputs a result of the compiling process and, more particularly, the present invention relates to a system for paralleling or rotating a rectangular area, including an image specified on a screen, by a coordinate specifying means such as a stylus, of the input unit.

2. Description of the Prior Art

Hitherto, the paralleling or rotation of an image on a display screen of the image information processing apparatus of this kind is carried out with the use of, for example, a combined display and tablet in a manner as shown in FIG. 3. The combined display and tablet is the one which corresponds in a coordinate system to a display screen and which is inputted with points of coordinates by a magnetic action when an accessory stylus is placed on the tablet. It is operable such that, when a position specifying switch attached to the stylus is turned on, a rectangular area 23 including an image 22 to be moved on the screen 21 can be specified, or the destination 24 to which the rectangular area so specified is desired to be moved. In a window (not shown) on the screen 21, a menu showing various modes for moving the rectangular area, such as a parallel move mode, a designed angle rotation and move mode, a rightward 90° rotation and move mode and a leftward 90° rotation and move mode, can be specified when a menu switch attached to the stylus is turned on. Thus, by specifying a desired menu with the stylus, a command appropriate thereto can be executed.

Assuming that the stylus located at a position indicated by a blank circle at step #1 is moved to a left top corner of the rectangular area, containing the image 22, as indicated by a black circle at step #2 while the position specifying switch is kept turned on and the tablet is then pressed, the rectangular area 23 to be moved can be specified. At step #3, the menu switch in the stylus is turned on by the stylus to select the parallel mode in the menu. Thereafter, the stylus whose position specifying switch is turned on is then moved to the position 24 indicated by a blank circle, followed by a depression of the tablet. As a result, the destination is specified at step #4 as indicated by the black circle. Further, when an execution key is then depressed during this condition, the paralleling of the image takes place with a new image 25 displayed on the screen at step #5. Also, when at step #3 the rightward 90° rotation mode is selected by the stylus, whose menu switch is turned on, and the tablet is subsequently depressed after the stylus whose position specifying switch is turned on has been moved to the position of the blank circle, the process flow goes to step #6. At step 6, while the rectangular area is rotated 90° rightwards, the destination can be specified at step #7 as shown by the black circle. The subsequent depression of the execution key results in the rightward 90° rotation accompanied by the paralleling. Thus, a new image 26 is then displayed on the screen at step #8. Where, at step #4 at which the destination for the paralleling has been specified, the desired angle rotation and move mode is selected by the stylus and the tablet is subsequently depressed after the stylus has been moved to the position of the blank circle, the rectangular area is rotated about the right-hand bottom corner thereof. Thus, the left-hand top corner of such rectangular area can be brought into alignment with a line connecting between the right-hand bottom corner of the rectangular area and the blank circle. Thereafter, the position is then specified at step #10 as shown by the black circle. If the execution key is depressed at this time, a new image 27 can be displayed at step #27 on the screen.

The paralleling or rotation of the image on the display with the use of the prior art combined display and tablet has a problem in that, once the rectangular area containing the image 22 is specified by the stylus, and both of the destination 24 and the mode are then specified, there is no other way, other than exiting the mode by depressing the execution key or depress a cancel key on the menu, to permit the process to be repeated from step 1. Because of this, where the image is desired to be inserted in a certain space in a certain material, and when the rectangular area is, at the time the insertion is carried out, adjusted in such a way go as to cause it to be rotated through a small angle or moved a small amount, the execution key has to be depressed each time it is moved or rotated. This thereby poses a problem associated with the complicated operating procedures. Also, if the specification is again tried by depressing the cancel key, the destination once determined up to that time will become uncertain, enhancing the complicated operating procedures. Also, according to the prior art system, since it is designed that the menu for the specification of the modes displayed in the window on the screen can be specified by the use of the stylus whose menu switch is turned on, there is a problem in that, when a screen portion is erroneously depressed by the stylus whose menu switch is not turned on, this will be erroneously be recognized that the specification of the rectangular area and the destination have been fixed. This thereby executes an erroneous area specification and move.

SUMMARY OF THE INVENTION

The present invention has for its essential object to provide a image paralleling and rotating system effective to eliminate the erroneous area specification and move resulting from an erroneous instruction from a coordinate specifying means by permitting an operator to check with the coordinate specifying means when the rectangular area containing an image to be processed is moved to the destination. It is also effective to accomplish a fine adjustment of the move of the rectangular area carried out by repeated instructions of the mode and the destination.

In order to accomplish the above described object, the present invention is directed to an image information processing apparatus including a combined display and input unit which includes a coordinate specifying means for specifying on a screen a rectangular area containing an image and also specifying the destination to which it is to be moved, a mode specifying means for specifying a move mode for the rectangular area to be one of a paralleling mode and a rotating mode, and a position specifying means for enabling the specification of the destination. In accordance with the present invention, an image paralleling and rotating system is so designed that, when the rectangular area specified by the coordinate specifying means is displayed in the screen as moved to the destination, enabled by the position specifying means, in accordance with instructions made by the mode specifying means, a decision is made to determine if the coordinate specifying means has specified a predetermined neighboring portion of a corner of the rectangular area so displayed. Further, if a result of the decision indicates that the coordinate specifying means has specified the neighboring portion of the corner of the rectangular area, instructions from the mode specifying means and the coordinate specifying means are rendered to be valid. This thereby avoids an erroneous movement of the rectangular area instructed by an erroneous instruction from the coordinate specifying means.

According to the present invention, assuming that the rectangular area specified by the coordinate specifying means is displayed on the screen as moved, for example, paralleled, to the destination, fixed by the position specifying means, according to the instructions from the mode specifying means, the operator causes the mode specifying means to select the rotation. This then causes the coordinate specifying means to specify the predetermined neighboring portion of that corner of the rectangular area displayed on the screen. This causes the position specifying means to validate them and finally causes a point on the screen to be specified. By so doing, the coordinate specifying means determines that the predetermined neighboring portion of that corner of the rectangular area has been specified, and the instructions of the move specifying means and the coordinate specifying means are validated. Thus, the rectangular area can be caused to rotate about, for example, a corner of the rectangular area diagonally opposed to that corner thereof so that the corner can be brought on a line connected between that corner of the rectangular area and the point on the screen, the position thereof being subsequently fixed. In this way, by causing the coordinate specifying means to again specify the predetermined neighboring portion of the corner of the rectangular area whose position has been fixed, then causing the mode specifying means to be in a desired mode (paralleling or rotation) and finally repeating the procedures in the manner as hereinabove described, the rectangular area can be further moved. On the other hand, unless the coordinate specifying means specifies the predetermined neighboring portion of that corner of the rectangular area displayed on the screen, the subsequent instructions from the move specifying means and the coordinate specifying means cannot be validated. Therefore, even though the coordinate specifying means erroneously specified any other point on the screen other than the predetermined portion of that corner of the rectangular area, neither the movement nor the specification of the destination is carried out. This thereby avoids any possible erroneous processing.

BRIEF DESCRIPTION OF THE DRAWINGS

This and other objects and features of the present invention will become clear from the following description taken in conjunction with a preferred embodiment thereof with reference to the accompanying drawings, in which:

FIG. 1 is a schematic block diagram showing an embodiment of an image information processing apparatus embodying the present invention;

FIG. 2 is a screen flowchart used to explain a system for paralleling or rotating an image in the image information processing apparatus.

DETAILED DESCRIPTION OF THE EMBODIMENT

Figure 3:
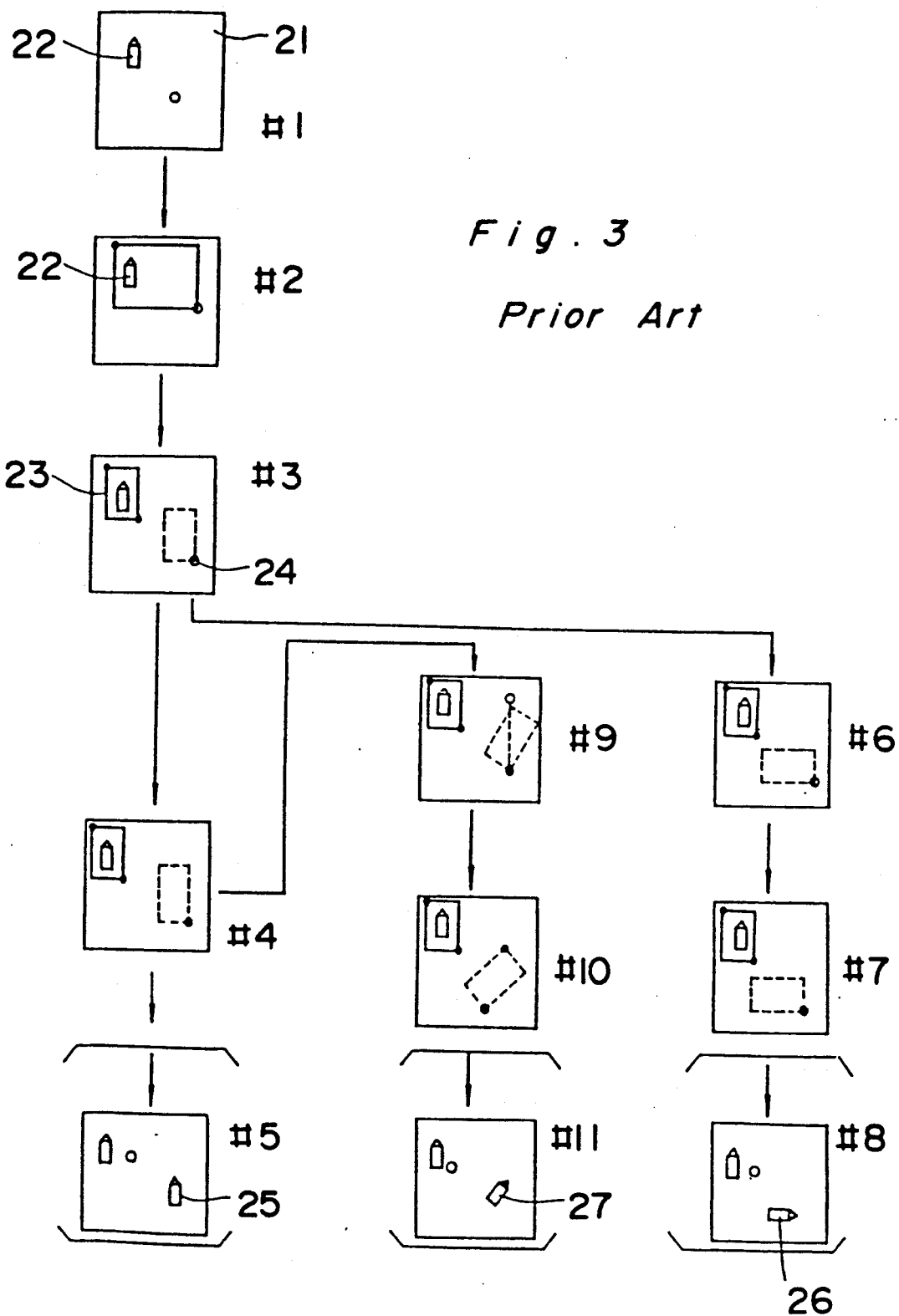
FIG. 3 is a flowchart similar to FIG. 2, showing the prior art system for paralleling or rotating the image.

Referring to FIG. 1, reference numeral 1 represents a combined display and tablet comprising an input unit including a stylus forming a coordinate specifying means and a keyboard and a display unit comprising a cathode ray tube. Reference numeral 2 represents a control unit for compiling information inputted from the input unit of the combined display and tablet 1, for outputting to the display unit of the combined display and tablet 1 and also for carrying out a paralleling/rotation of an image displayed on the display unit. Further, reference numeral 3 represents a printer for printing a result of the compilation according to a printing output from the control unit 2.

The system of coordinates of a tablet of the combined display tablet and and that of the cathode ray tube correspond point-to-point with each other. Further, as is the case with the prior art, a menu for specifying a move mode to be a paralleling mode or a desired angle rotating and moving mode can be displayed when a menu switch of the stylus is turned on, and the stylus is also provided with a position specifying switch for validating the specification of a rectangular area and the destination to which it is moved. By specifying the menu and the coordinates on the screen with the stylus whose position specifying switch is turned on, the selection of one of the move modes and that of the destination are validated.

The control unit 2 is operable to determine if, when the rectangular area specified by the stylus whose position specifying switch has been turned on is displayed on the screen as paralleled or rotated and moved to the destination, fixed by the stylus, according to the specification of the menu, the stylus is placed in the vicinity of one of the four corners of the rectangular area (See step S7 in FIG. 2). Further, only when it is determined that the stylus has been so placed, the subsequent menu specification and the destination by the stylus are validated.

The image paralleling and rotating system in the image information processing apparatus of the above described construction will now be described with reference to a screen flowchart shown in FIG. 2.

The program flow from step S1 to S3 is identical with the program flow from step #1 to #3 shown in FIG. 3. Specifically, when the stylus located at the position of a blank circle in step S1 is, after its position specifying switch has been turned on, moved to a left-hand top corner of a rectangular area containing an image 6, as shown by a black circle at step S2 and the tablet is then depressed, and when the tablet is again depressed after having been moved to a right-hand corner of the rectangular area as shown by a black circle at step S3, the rectangular area 7 to be moved can be specified. At this step S3, with the use of the stylus whose menu switch is turned on for the first time, a move mode is specified on the menu to be a paralleling mode. Subsequently, the stylus whose position specifying switch is turned on, is moved to a position 8, shown by a blank circle, which is the destination to which the rectangular area is desired to be moved, followed by the depression of the tablet.

As a result thereof, the rectangular area 7 can be paralleled according to the specification of the menu to the destination 8 validated by the position specifying switch and is displayed on the screen as shown by the phantom line at step S6. At this time, after the mode is specified on the menu to be a desired angle rotation and movement by turning on the menu switch of the stylus, and when the stylus at a position shown by a blank circle at step S6 is placed at the neighborhood of a left-hand top corner (a hatched area in FIG. 2), as shown by a black circle at step S7, while the position specifying switch is kept turned on, the control unit 2, which has determined that the stylus has been placed at a predetermined position, validates the specification of the desired angle rotation and movement on the menu and the subsequent specification of the destination. In other words, when the stylus is placed at a point on the screen as shown by a black circle at step S8, the rectangular area is displayed in the form a having its left-hand top corner thereof rotated about its right-hand bottom corner to a position on the line connecting between the right-hand bottom corner and such point. Thus, where no further moving process is effected to the rectangular area 9 displayed at step S8, step S4 takes place to depress a final execution key on the keyboard. Then, as shown at step S5, a image 6 is moved in correspondence with the rectangular area 9 to a position shown by an image 10 which is then displayed. This thereby completes a cycle of the movement in readiness for the next subsequent cycle starting from step S1.

On the other hand, where a further movement is to be carried out subsequent to step S8, the menu switch of the stylus is to be turned on, followed by the specification of the move mode on the menu to the paralleling and movement mode, and the stylus whose position specifying switch is turned on again is to be placed from the position of the blank circle at step S9 to the neighboring of the right-hand bottom corner (a hatched area in FIG. 2) as shown by a black circle at step S10. Thus, it is is determined that the stylus has been placed at the predetermined position, with the consequence that the specification of the paralleling and movement and that of the destination to which it is desired to be subsequently moved can be validated. In other words, when the stylus is placed at the position shown by the black circle at step S11, the rectangular area is displayed in the form as paralleled. Where no movement is effected to the rectangular area 11 so displayed, the process proceeds to step S4, as is the case with the previously described process and an image processed in correspondence with the rectangular area 11, can be displayed by the depression of the execution key. It is to be noted that, where no desired angle rotation and movement at steps S3, S6 and S7 is necessary, it is possible to shift to the execution at step S4 as shown. Further, in such a case, the image processed in correspondence with the previous rectangular area can be displayed. Also, if the desired angle rotation and movement is changed to the paralleling and movement by the menu selection at steps S6 and S7, it is possible to immediately shift to step S9. Further, if the desired angle rotation and movement is specified at steps S9, S10 and S11 by the selection of the menu, it is also possible to shift to steps S6 to S8.

Thus, according to the foregoing embodiment of the present invention, when the rectangular area containing the image and specified by the stylus having the position specifying switch and the menu switch is displayed as moved to the specified destination in correspondence with the mode, and only when the stylus is placed in the vicinity of the four corners of the displayed rectangular area, the specification of both of the mode and the destination by the stylus can be validated. Therefore, each time the stylus is placed in the vicinity of the four corners of the rectangular area which has been moved during the previous mode, the destination to which the rectangular area is moved can be validated. In view of this, by repeating this procedure, a fine adjustment of the paralleling or rotation can be accomplished. Also, unless the stylus is placed in the vicinity of the four corners of the rectangular area, the subsequent specification of both of the mode and the destination cannot be validated. Therefore, even though the stylus is erroneously placed on the screen other than the neighbor of the four corners of the rectangular area, the condition in which the rectangular area is moved is retained with no further process affected. Accordingly, any possible erroneous process can be effectively eliminated.

Although the present invention has fully been described in connection with the illustrated preferred embodiment thereof with reference to the accompanying drawings, it is to be noted that various changes and modifications are apparent to those skilled in the art. Such changes and modifications are to be understood as included within the scope of the present invention as defined by the appended claims.

What is claimed is:

1. An image information processing apparatus including a combined display and input unit, the input unit comprising:

coordinate specifying means for specifying and displaying on a screen on the input unit, a rectangular area containing an image and for further specifying and displaying the rectangular area of a destination to which the image is desired to be moved;

mode specifying means for specifying a move mode for the rectangular area to be one of a paralleling mode and a rotating mode;

position specifying means for enabling specification of the desired destination wherein, the rectangular area specified by the coordinate specifying means is displayed on the screen as moved to the desired destination and enabled by the position specifying means, in accordance with the mode specified by the mode specifying means; and determination means for determining whether or not the coordinate specifying means has specified a predetermined neighboring portion of a corner of the rectangular area so displayed, and for validating, if a result of the determination indicates that the coordinate specifying means has specified the neighboring portion of the corner of the rectangular area, specifications from the mode specifying means and the coordinate specifying means, thereby avoiding an erroneous result.

* * * * *